United States Patent Office 3,455,458
Patented July 15, 1969

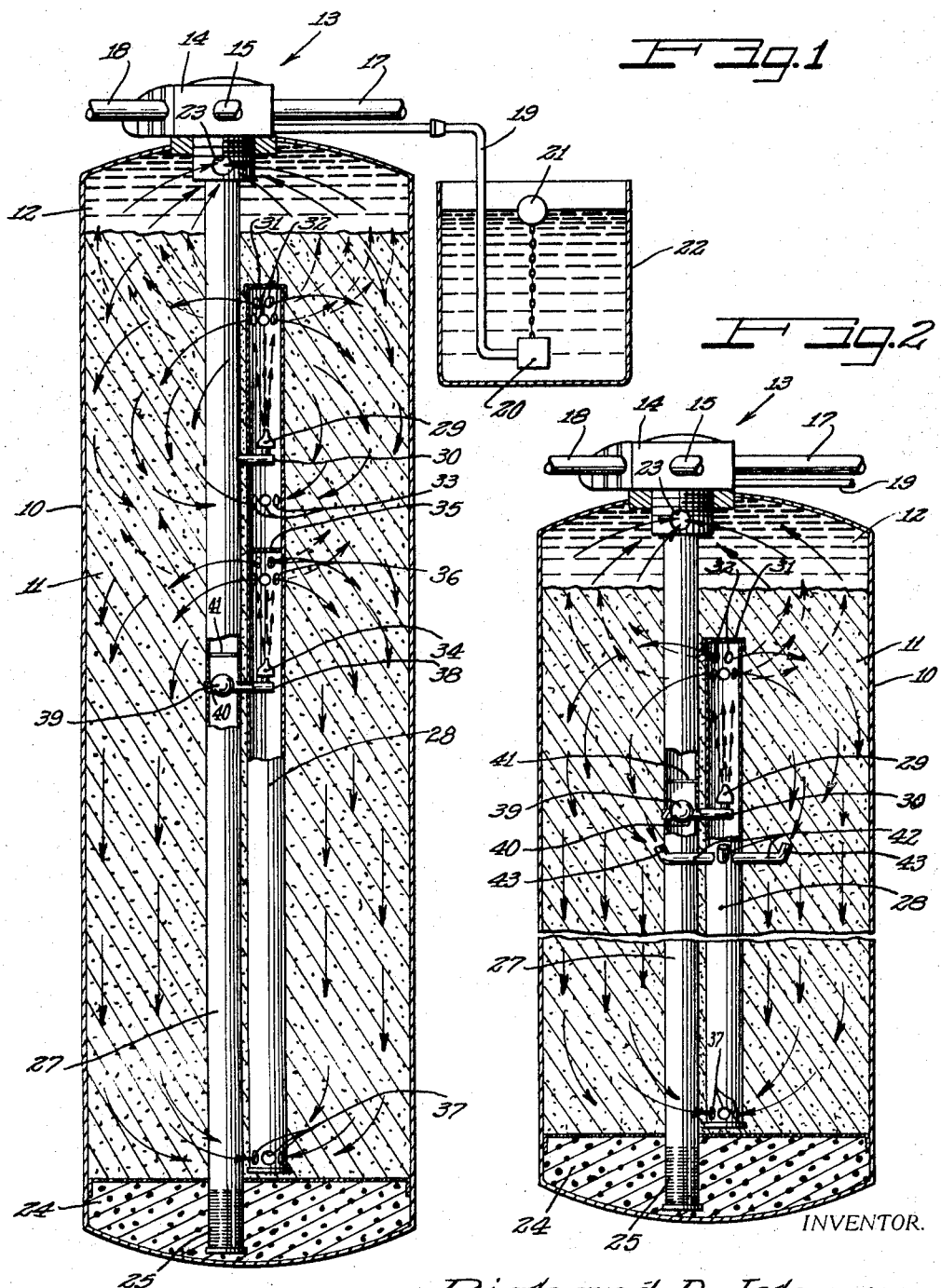

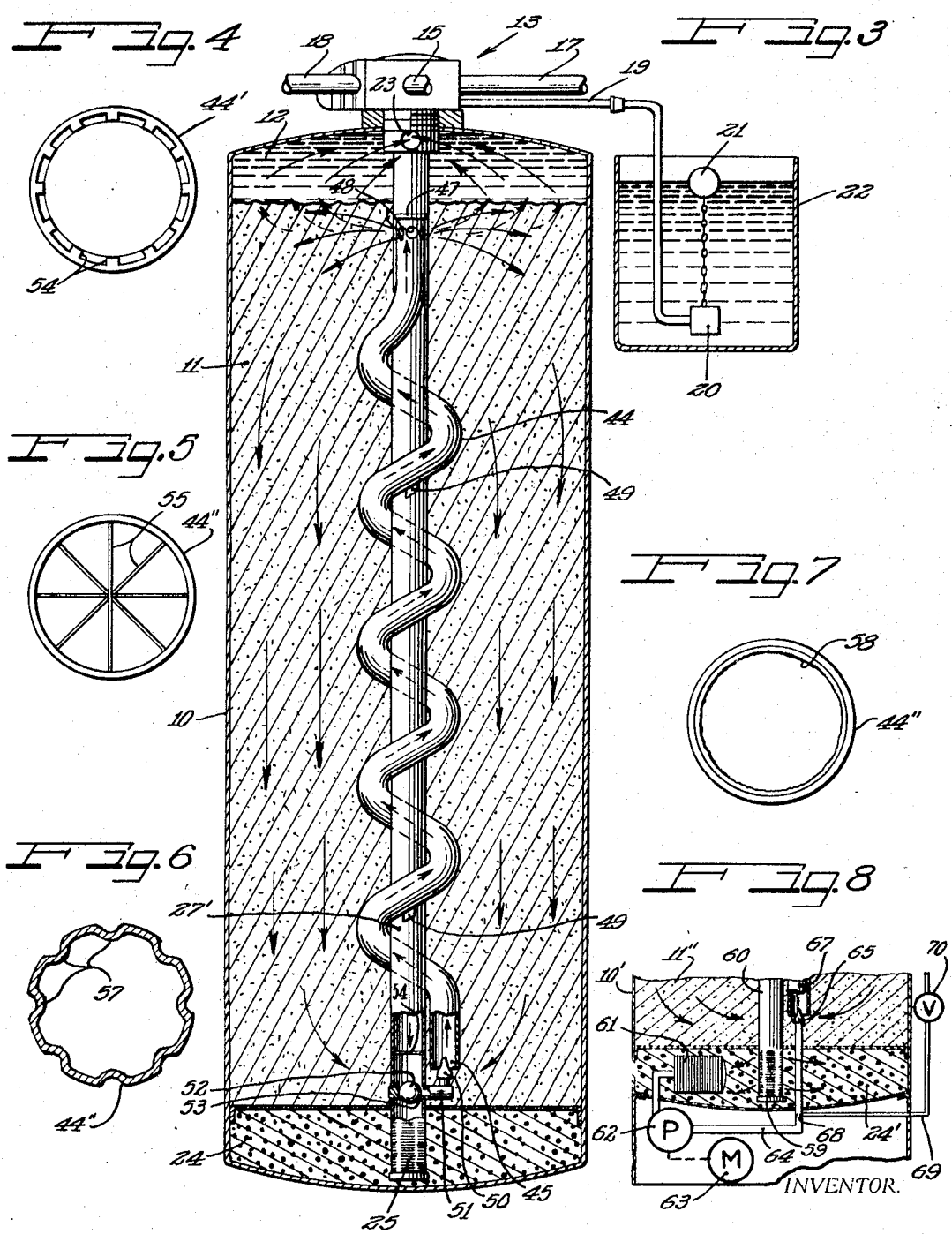

3,455,458
MINERAL BED BACKWASHING DEVICES
Richard D. Johnson, 1467 Wicke Ave.,
Des Plaines, Ill. 60018
Filed June 27, 1968, Ser. No. 740,502
Int. Cl. C02b 1/40; B01j 1/04
U.S. Cl. 210—197   12 Claims

ABSTRACT OF THE DISCLOSURE

A scrubbing tube extends upwardly through a mineral bed and has its upper end located adjacent to and discharging below the top of the bed laterally. Washing fluid injected upwardly in the tube draws mineral from a lower region of the bed into the tube. There may be a plurality of washing stages at different elevations in the bed for zoned cleaning action. Scrubbing action may be enhanced by tortuous or spiral formation of the tube, scrubbing vanes, impingement surfaces, abrasive tube wall liner, pumped circulation.

---

This invention relates to the cleansing of particulate mineral beds and more particularly to backwashing such beds which have served primarily or incidentally as filter beds.

As liquid filters downwardly through a mineral bed, foreign matter collects on the particulate mineral of the bed with generally greater concentration of said matter in the upper regions of the bed. Periodically the foreign material must be removed from the bed, as by backwashing.

Although it will be readily apparent as the description proceeds that the present invention is usable in many varied filtration and treatment systems in which filtration is at least part of a service cycle, an important practical utility of the invention is found in water softening apparatus utilizing ion exchange mineral which requires regeneration desirably preceded or accompanied by backwashing of the mineral bed to cleanse it of foreign matter filtered from the water which has passed downwardly through the bed during the service cycle in the operation of the apparatus or system. As the untreated water enters the softner tank above the mineral bed and then travels downwardly through the mineral, foreign matter such as iron oxides, and other mineral particles in addition to calcium, magnesium, and the like, in solution, which cause the water to be objectionably hard and are primary reasons for treatment of the water, filter out on, and to a substantial extent may attach themselves to, the ion exchange mineral. In time, the foreign matter seriously interferes with the ion exchange activity of the mineral. It has, therefore, been common practice in water softeners and other ion exchange systems, as well as in respect to discrete particle filter beds generally, to effect periodic backwashing of the bed to dislodge and float off foreign matter.

Some foreign materials, such, for example, as iron oxide have a tendency to adhere to the particles of mineral in the bed. At times such foreign material may even effect agglomeration or caking of the mineral particles to the extent that ordinary percolating type of backwashing will not suffice to attain adequate or at least desirable cleaning of the mineral.

In my copending application Ser. No. 466,549 filed June 24, 1965, now Patent No. 3,395,099, I have disclosed the basics of my novel arrangement and method of backwashing wherein the mineral is cleansed by injecting a stream of backwashing liquid into a scrubbing tube having its discharge end substantially below the top of the mineral bed, with a circulation of mineral particles from the bed being ejected into the tube. While as a matter of fact, by circulating the mineral in the bed caking or channeling of the bed has been avoided; reduction in the time and volume of flushing fluid needed to effect backwashing while attaining substantial increase in cleansing action has resulted; and it has been possible to use a higher mineral concentration in a given tank space or volume; it has still been necessary, even though the discharge end of the scrubbing tube was located below the top of the bed to have a substantial space between the top of the bed and the drain outlet from the tank because the upward discharge from the scrubbing tube while substantially damped by the overlying mineral did cause the mineral to rise although significantly less than with the ordinary percolating backwashing systems.

I find that substantially improved results are attained by providing means for discharging the scrubbing fluid and entrained mineral particles laterally in a generally horizontal direction into the mineral bed rather than upwardly. Thereby the discharge end of the tube may be located closer to the top of the mineral bed, and the top of the mineral bed may be located substantially closer to the drain opening because there is even less lifting of the top of the mineral bed than experienced with the upwardly discharging tube arrangement of my prior devices.

I also find that further improved results are attainable by zoned cleaning of the mineral bed, and by increasing the scrubbing action to which the mineral is subjected.

It is, accordingly, an important object of the present invention to provide a novel and more efficient backwashing device for particulate mineral filtration beds, and the like, which will be referred to generically hereinafter as "mineral beds."

Another object of the invention is to provide new and improved backwashing means for mineral beds which will permit substantial reduction in tank size for mineral volume as compared to prior arrangements, or will permit the use of a greater volume of mineral in tanks of equal size to former arrangements.

A further object of the invention is to provide zoned cleansing of mineral beds.

Still another object of the invention is to provide novel mineral bed scrubbing means having improved mineral scrubbing efficiency.

Yet another object of the invention is to provide novel means for scrubbing the mineral of mineral beds in a programmed manner with minimum drain off.

Other objects, features and advantages of the present invention will be readily apparent from the following detailed description of certain preferred embodiments thereof taken in conjunction with the accompanying drawings, in which:

FIGURE 1 is a schematic vertical sectional detail view of apparatus embodying features of the invention, more particularly as related to a water-softening system;

FIGURE 2 is a similar, though fragmental vertical sectional view showing a modification;

FIGURE 3 is a similar vertical sectional view showing still another modification;

FIGURE 4 is a transverse sectional detail view of a scrubbing tube having spiral agitating means therein;

FIGURE 5 is a transverse sectional view of a scrubbing tube having scrubbing impingement surface means therein comprising transverse bars or wires;

FIGURE 6 is a transverse sectional view through a scrubbing tube having impingement surfaces in the form of inward projection;

FIGURE 7 is a transverse sectional view of a scrubbing tube having a mineral-cleansing enhancement liner; and FIGURE 8 is a fragmentary vertical sectional schematic detail view of an arrangement having a circulating pump and providing for regeneration of ion exchange mineral.

As an example of utility of the present invention, FIG. 1 discloses a water softener which may be of the relatively small domestic type or which may be of a commercial size and comprises a vertical tank 10 having therein a mineral bed 11 of any preferred ion exchange minerals suitable for the purpose. Above the top of the mineral bed a relatively shallow plenum space 12 provides a liquid storage or reservoir area into which extends an operative portion of a flow-controlling unit 13 mounted in and on the top of the tank. This unit includes a valve housing and distributor body 14 having a raw-water intake 15, a treated water delivery or service conduit 17 and a drain outlet 18. Also connected to the body 14 is a regenerant or brine intake duct 19 leading from a brine level controlling valve structure 20 controlled by a float 21 within a tank 22. Suitable means, not shown, are provided on or in association with the body 14 for manually or automatically operating the system through service, backwashing and regeneration and washing cycles.

During the service cycle, raw-water received through the intake 11 passes under valve control through a port 23 opening from that portion of the housing 14 which extends into the plenum space 12 and closely adjacent to the top of the tank. In response to service demand, the raw-water filters down through the mineral bed 11 and into an underlying optional coarse gravel bed 24 within which is a screen 25 by which the treated water enters a vertical manifold pipe 27 carried by and communicating with the housing 14. Thence, the treated water is directed through the housing 14 into the service conduit 17.

Before regenerating the mineral in the bed 11, it is customary to backwash for a suitable time interval to cleanse the bed of foreign material brought into the tank with the raw-water. For this purpose, it has heretofore been customary to valve the wash water from the raw-water supply downwardly through the manifold 27 to issue from the screen 25, serving as a distributor, and to percolate upwardly through the mineral bed and thereby float foreign material from the mineral to be withdrawn through the port 23 to pass off through the drain 13. This has caused the entire bed to rise and it was necessary to have the outlet port 23 at a considerable height above the normal top of the mineral bed and at least substantially above the highest level reached by the top of the mineral bed during the backwashing cycle to avoid loss of mineral into the drain, or clogging of any screen across the port.

According to the present invention, backwashing is effected in a substantially improved manner which greatly reduces lifting of the mineral bed upwardly during backwashing so that a great saving in head room is attained within the tank, while at the same time the backwashing cycle is substantially accelerated and efficiency improved. As a result, a larger volume of material may be utilized in a tank heretofore capable of accommodating only a smaller volume of mineral for the same capacity or a smaller tank may be employed for the same volume of mineral as heretofore deemed necessary to accommodate a given situation as to hardness rating of water, and the like.

Improved backwashing is attained by the provision of a scrubbing stack or tube 28 which is desirably located as close as practicable to the vertical center of the mineral bed 11 with the lower end of the tube adjacent to the bottom of the bed and the upper end of the tube adjacent to the top of the mineral bed. Conveniently the scrubbing tube 28 is attached to and supported by the manifold 27.

Means are provided for introducing backwashing fluid into the scrubbing tube 28 in a manner to effect circulation of the mineral of the bed 11 with the backwashing water and return of the mineral to the bed below the top of the bed. For this purpose, at least one backwashing fluid nozzle 29 is mounted to emit a stream of backwashing water under supply line pressure upwardly within the scrubbing tube 28. Conveniently, the nozzle 29 is carried by a branch duct 30 extending into the tube 28 from and communicating with the interior of the manifold 27 through which the backwashing water is supplied. From the nozzle 29, the backwashing water stream drives upwardly towards a deflector 31 extending across the upper end of the tube 28. Desirably, the deflector 31 is in the form of a closure cap attached to the top of the scrubbing tube, although if desired it may be in the form of a hood. Whatever the structure of the deflector it is such as to effect lateral movement of the washing fluid below the top of the mineral bed through a suitable opening or openings, in a desirable form comprising one or more lateral openings 32. As shown, two annular series of vertically spaced and staggered ports 32 are shown enabling free but substantially uniformly laterally controlled egress of the washing fluid from the upper end portion of the scrubbing tube to travel with substantially equalized efficiency upwardly through the upper portion of the mineral bed, effecting a gentle substantially uniform minimal lift to dislodge and sweep foreign material from the area or zone of maximum density of such material into the reservoir space 12, as indicated by the dashed directional lines and to the drain through the port 23.

The construction and relationship of the scrubbing tube 28 and the nozzle 29 are such that injection of the stream of backwashing fluid into the tube by the nozzle also ejects a circulation of mineral particles from the bed into the tube to be scrubbed and discharged from the discharge end of the tube. For this purpose the tube has one or more openings adjacent to the nozzle into which mineral from the bed is uniformly drawn while the nozzle 29 is in operation. For uniformity of indrawing of the mineral, the scrubbing tube is provided with an annular series of substantially uniformly spaced mineral intake ports 23 which are located below the nozzle. As a result, the ejector action of the nozzle stream causes mineral to be drawn into the tube through the ports 23, driven turbulently upwardly through the tube with the washing water stream and then ejected laterally into the mineral bed, whereby the mineral bed in the zone between the top of the scrubbing tube and the ports 33 is circulated as indicated by the directional arrows and thoroughly cleansed.

While the nozzle 29 may be used alone, especially in a relatively short tank or shallow mineral bed, in a deep mineral bed a plurality of such nozzles is desirably employed in tandem relation whereby to increase the beneficial results of the indicated washing and scrubbing treatment by affording a zoned system in which various advantageous features are attainable, such as more intense scrubbing and circulating action with respect to a selected zone, such as in the upper portion of the mineral bed, greater assurance of multi-cyclical circulation of the mineral in the bed, selective cycling of the mineral, and the like. For example, in the arrangement shown in FIG. 1, the nozzle 29 and its associated portion of the tube 28 are positioned to circulate the mineral in about the upper one-third of the bed, while a similar washing fluid injection nozzle 34 is located operatively in relation to and functions with a lower portion of the scrubbing tube for effecting cleansing circulation of the mineral in the approximately lower two-thirds of the bed. This differential in length of the cleansing circulation path, taken together with a differential in flow rate of about one and a half to two times as great in respect to the upper nozzle 29 as in respect to the lower nozzle 34 assures highest efficiency since most of the foreign matter filtered to be washed from the bed is in the upper one-third. It will thus be observed that backwashing of the bed can thus be effected more rapidly with the same amount of washing fluid as in conventional backwashing systems, or a much more thorough backwashing is effected with expenditure of the same volume of backwashing fluid as in conventional systems.

In a desirable construction, the tube 28 is constructed as a single tubular member and has spaced above the lower nozzle 34 and suitably below the mineral ingress ports 33 a deflector partition 35 toward which the stream from the nozzle 34 is directed. Adjacently below the deflector 35 is lateral or side action mineral egress passage means comprising, by way of example, vertically spaced, staggered annular series of ports 36 from which scrubbingly agitated mineral is directed into the mineral bed to travel downwardly and replace mineral that has been ejected into the tube through an annular series of spaced ingress ports 37, substantially as indicated by the solid line directional arrows while the foreign matter dislodged from the scrubbed mineral is carried on upwardly through the bed substantially as indicated by the dashed directional arrows.

Mounting of the nozzle 34 may be effected substantially the same as the nozzle 29 by means of a tubular communication mount 38 opening into the manifold 27, and desirably cooperating with the tubular mount 30 for the nozzle 29 in mounting the scrubbing tube 28 on the manifold. Adjacently below the entrance into the tubular duct mount 38, a check valve 39 closes off the lower portion of the manifold 27 during the backwashing cycle so that the backwashing water is diverted to the nozzles 29 and 34. In a desirable construction, the check valve 39 is a ball valve which during the backwashing cycle seats on a valve seat 40 and during the service cycle is lifted by the liquid moving upwardly through the manifold from the screen 25 and is retained adjacent to the seat by a suitable stop or spider 41.

In the modification of FIG. 2, the tank 10, mineral bed 11, plenum space 12, controls structure 13 and other features of the system are identical with the corresponding structures of the form of FIG. 1 and it will be understood that the description applies equally to identical elements in both forms as identified by the identical reference numerals unless otherwise described.

In the form of FIG. 2, the nozzle 29 is depicted as used alone in the scrubbing tube 28 rather than in a tandem relation to one or more other nozzles, and it will be understood that this is illustrative and a matter of choice. In this instance, the check valve 39 and the valve seat 40 are associated with the end of the tubular mount 30 for the nozzle.

In the FIG. 2 form of the invention, a proportional circulation of the mineral through the scrubbing tube 28 is attained by receiving mineral into the tube not only at its lower end through the ingress ports 37, but also in a controlled manner intermediately along its length and desirably adjacently below the nozzle 29 through radially outwardly extending tubular intake arms 42 which may, as shown, have generally upwardly directed angular inlet ends 43. Through this arrangement, a desirable proportion such as one-fourth to one-third of the mineral in the upper zone of the mineral bed is recirculated with greater frequency by the jet ejector action of the stream from the nozzle 29 while the rest of the mineral circulates the longer route through the ports 37. It will be obvious that the mineral intake arms 42 may be as long or as short as the circumstances of the particular installation may require, they may be of graduated length in the annular radiating series, and there may be a plurality of vertically spaced series of such intake arms, if desired.

In FIG. 3 is shown another form of the invention and according to which substantially improved mechanical cleaning of the particulate mineral in the bed is effected. The arrangement shown also causes the mineral particles to travel a greater distance than the height of the mineral bed while nevertheless attaining other advantages of the invention and more particularly the minimal lifting of the upper surface of the bed during backwashing. To this end, a scrubbing tube 44 is provided which has a flow path therethrough of greater length than a straight line distance between the ends of the tube. In one advantageous form, as shown, the tube is of tortuous and more particularly spiral form with the convolutions progressing upwardly from a lower end inlet 45 to an upper end which is desirably equipped with a deflector 47 which, as shown, is desirably in the form of a cap on the upper end of the tube with at least one annular series of egress ports 48 adjacently below the cap. Use of the scrubbing tube 44 may be in a tank 10 having a body of particulate mineral 11 similarly as, and for the same purpose as the tank 10 of FIG. 1 and identical reference numerals apply to the same elements and the same description as in respect to FIG. 1 will be understood by reference. For convenience in mounting the same, the tube 44 may be, in effect, wrapped about the tubular manifold 27', with attaching means 49 securing the tubes together at suitable intervals to support the tube 44 on the tube 27 with the inlet end 45 adjacent to but spaced above the gravel bed 24 a sufficient distance to receive therein a washing liquid jet nozzle 50 connected as by means of a tubular mount 51 in communication with the interior of the manifold 27' and with a check valve 52 such as a ball arranged to engage a valve seat 53 adjacently below the inlet into the duct of the mount 51 to divert the backwashing fluid from the manifold to the nozzle 50. During service operation of the system, the check valve ball 52 opens the port within the valve seat 53 and is retained against undue displacement up the manifold by a stop 54. At its upper end portion, the scrubbing tube 44 has the egress ports 48 located adjacently below the top of the mineral bed 11 such that wash water may carry off foreign matter cleaned from the scrubbed bed mineral upwardly through the upper portion of the bed and also remove loose material from such upper portion of the bed, substantially as indicated by the dashed flow lines. Mineral ejected laterally from the ports 48 joins the upper portion of the mineral bed as the mineral circulates downwardly as indicated by solid flow lines while the mineral in the lower portion of the bed is ejected by the jet stream from the nozzle 50 into the scrubbing tube 44 through its lower entrance end 45. As it is driven along the tube passage the mineral particles are mechanically bounced against the angular wall sections and agitated to strike one another.

A similar extended scrubbing action is attainable by providing a straight scrubbing tube 44' (FIG. 4) with means such as rifling 54 which causes a vorticity of the washing fluid and mineral particles as the fluid travels upwardly through the scrubbing tube, tending to drive the mineral centrifugally against the rifling 54 and with efficient rubbing, scrubbing action.

In respect to both of the forms of FIGS. 3 and 4, the velocity and volume of washing fluid may be adjusted to attain optimum results for the length and diameter of the respective scrubbing tube or more particularly the path provided by the tube. If desirable or necessary, one or more booster jets of washing fluid may be provided along the length of the tube upwardly beyond the lower primary jet stream injector and mineral ejector nozzle 50. The booster nozzles may be supplied in the manner suggested by the primary jet nozzles in FIG. 1.

Additional means for attaining improved mechanical scrubbing action are depicted in FIGS. 5–7. In FIG. 5 the scrubbing tube 44'' has impingement type scrubbing means therein comprising bars or wires 55 extending across the flow path within the tube. These members 55 may be strung diametrically across the interior of the tube and in crossing relation to one another in a suitable pattern that may be by groups spaced longitudinally along the tube or may be individually strung at suitable intervals longitudinally along the flow path so that the mineral jetted through the scrubbing tube will impinge the members 55 and bounce therefrom into one another to increase the agitation and scrubbing interaction of the mineral particles. In FIG. 6 the scrubbing tube 44'' has numerous inward projections along its wall which may be in a suitable pattern both circumferentially and longitudinally to attain direct mechanical impingement of the particles, bounce off of the particles and improved interimpingement of the particles against one another. In FIG. 7, the scrubbing tube 44'' is provided with a roughened liner 58 providing a more or less irregular rough impingement scrubbing surface to attain the direct mechanical, bounce off and inter-impingement cleansing action in respect to the particles.

In FIG. 8 is shown an arrangement wherein it is possible to effect a more intense scrubbing of the mineral particles in the scrubbing tube by a pumping action as well as to attain a programmed mineral cleansing. To this end, a tank 10' has a mineral bed 11' therein above a gravel bed 24' into which a screen 59 of a manifold 60 extends such that backwash water may be delivered into the tank through the screen as indicated by the flow arrows. For increasing the wash fluid pressure, fluid is drawn from within the gravel bed 24' through a screen 61 by a pump 62 driven by suitable motor 63 and delivered through a conduit 64 extending up through the bottom of the tank to an injector jet nozzle 65 which discharges a jet stream into the lower open end of a scrubbing tube 67 which may have the attributes of any of the scrubbing tubes hereinbefore described, including a top end deflector and lateral wash water and scrubbed mineral distribution means. Before introducing wash water into the tank, the pumping system may be operated to effect cleansing of the mineral and a thorough stirring up of the foreign material, so that when the wash water is introduced into the tank either while the pumping system is operating or even without such system in operation, the foreign material will be efficiently removed. Desirably the pump jet stream remains in operation while the wash water is introduced through the manifold screen 59 so that advantage of the minimum lifting of the mineral bed may be had as a result of the deflector equipped upper end of the scrubbing tube, similarly as in FIG. 1. The pumped cleansing flow system is especially well suited to areas of high water cost since extremely efficient cleansing action with a very high rate of circulation flow is attainable with minimum backwash water drainoff. It may be desirable to effect regeneration of the mineral while it is ejected through the scrubbing tube 67 by action of the jet nozzle 65. Means for this purpose comprise an eductor 68 mounted in the duct 64 and to which a brine duct 69 is connected under the control of a valve 70. While regenerant is introduced into the backwashing jet stream, slow flow to drain is effected, and by virtue of the pumping action the mineral may be circulated through several cleansing cycles to attain maximum contact of every particle of the mineral with the regenerant.

In all forms of the invention it will be apparent that extremely high mineral cleansing efficiency is attained. Higher velocity washing fluid jet action is permitted in this type of backwashing operation than has been possible heretofore while at the same time less lifting of the top of the mineral bed occurs. Undesirable upcurrents, surge effects, roiling of the mineral in the reservoir or plenum space above the bed, and the like, are avoided. Simplicity of structure and great adaptability to meet all kinds of requirements and preferences are provided and numerous economies effected.

It will be understood that variations and modifications may be effected without departing from the spirit and scope of the novel concepts of this invention.

I claim as my invention:

1. In a liquid treatment system comprising a tank and a particulate mineral bed therein adapted to be cleaned by backwashing and dislodging of foreign material therefrom:
   a tubular scrubbing member extending upwardly relative to said bed communicating in an ingress relation with a lower portion of said bed and communicating in discharge relation with an upper portion of and below the top of said bed;
   means for driving a stream of backwashing fluid through said member and effecting ingress of mineral from the bed into said stream; and
   discharge means including a deflector across the top of said member to direct the backwashing fluid and entrained mineral generally horizontally into said upper portion of the bed to effect dissipation of velocity of the fluid and to return the entrained mineral to the bed while additional mineral enters the member from the bed by action of said driving and ingress effecting means;
   whereby cleansing circulation of the mineral is effected with minimum lifting of the top of the bed even though the backwashing fluid stream is driven at substantial velocity and there is concurrent withdrawal of fluid and dislodged foreign material from the bed.

2. A system according to claim 1, in which said tubular member extends upwardly within the bed, and said discharge means comprise a series of lateral openings from the upper end portion of the member.

3. A system acording to claim 1, in which said means for driving a stream of backwashing fluid comprise a fluid jet nozzle located within the member, and said member has ingress openings laterally thereinto below said nozzle.

4. A system according to claim 1, in which said tubular member has a plurality of backwashing fluid jet nozzles located longitudinally therealong.

5. A system according to claim 4, in which there is a partition between said nozzles, with separate egress openings from the tubular member located beyond the respective nozzles, and separate ingress openings into the tubular member for the respective nozzles.

6. A system according to claim 1, including a manifold, said means for driving backwashing fluid comprising a nozzle, and means effecting communication between the nozzle and the manifold and, at least in part, providing means for attaching the member to the manifold.

7. A system according to claim 1, in which said member is of substantial length, said means for driving a stream of backwashing fluid comprises a nozzle located at an intermediate point along the length of said member, and the member has ingress openings at its lower end and additional ingress means between said lower end and said nozzle.

8. A system according to claim 7, in which said intermediate ingress means comprise radiating tubular arms.

9. A system according to claim 1, comprising a vertical manifold extending through the mineral bed, and said member comprises a generally spiral tube extending about said manifold.

10. A system according to claim 1, including mechanical means in said member to effect scrubbing and agitation of mineral particles in their passage therethrough with the backwashing fluid.

11. A system according to claim 1, having means including a pump and a motor driving said pump for supplying said means for driving a stream of backwashing fluid with the fluid derived from fluid in said bed and enabling programmed scrubbing of the mineral in said tube through a plurality of cycles before drawing off backwashing fluid from the tank.

12. A system according to claim 11, including a duct connecting a regenerating fluid with said means for driving backwashing fluid.

References Cited

UNITED STATES PATENTS

| 1,644,469 | 10/1927 | Green | 210—33 |
| 2,365,293 | 12/1944 | Robinson | 210—197 X |
| 3,395,099 | 7/1968 | Johnson | 210—35 |

SAMIH N. ZAHARNA, Primary Examiner

U.S. Cl. X.R.

210—35, 275